United States Patent

Theis

[15] 3,668,325

[45] June 6, 1972

[54] MULTIPLIER CIRCUIT FOR AUTOMATIC TELEPHONE ANSWERING SYSTEM

[72] Inventor: Peter F. Theis, 70 W. Burton Place, Chicago, Ill. 60610

[22] Filed: Mar. 22, 1971

[21] Appl. No.: 126,519

[52] U.S. Cl. ....................179/6 C

[51] Int. Cl. ....................H04m 1/64

[58] Field of Search .........179/6 C, 6 E, 2 A, 2 DP, 100.1 DR

[56] References Cited

UNITED STATES PATENTS 2,213,511 9/1940 Bennett....................179/6 C

*Primary Examiner*—Bernard Konick
*Assistant Examiner*—Raymond F. Cardillo, Jr.
*Attorney*—E. Manning Giles, J. Patrick Cagney, Michael A. Kondzella and Richard A. Zachar

[57] ABSTRACT

A multiplier circuit for an automatic telephone answering system allows a single automatic answering unit to service a number of telephone lines simultaneously.

The system provides two message cycles to the first caller and then shuts off. Additional calls may be received and served at the same time, with each hearing the remaining portion of the message cycle then in progress plus one additional complete message cycle.

2 Claims, 3 Drawing Figures

INVENTOR
PETER F. THEIS
BY J. Patrick Cagney
ATTORNEY

MULTIPLIER CIRCUIT FOR AUTOMATIC TELEPHONE ANSWERING SYSTEM

BACKGROUND OF THE INVENTION

This invention relates to a multiple line automatic telephone answering system wherein a number of telephone lines are terminated in separate recorder couplers to be served by automatic answering equipment. In particular, the automatic answering equipment includes a continuous tape loop having a control tab that controls playback of a pre-recorded message on the tape. The answering equipment includes switching posts that cooperate with the control tab in determining the playback cycling.

Prior to the present invention, the most common technique for handling multiple line answering services was to provide a separate automatic answering unit for each telephone line. In addition to the high cost resulting from the use of a number of expensive automatic answering units, any messages recorded by the calling party had to be recorded on every unit.

Another system which has been employed involves the use of a multiplexer arranged to enable a single telephone answering unit to service a number of lines. For example, as many as four, with the answering unit serving the lines only one at a time. In this system, when the first caller was receiving a message a second caller would receive no answer until after the message was completed to the first caller.

SUMMARY OF THE INVENTION

In accordance with the present invention, a multiple line automatic answering system is provided with a multiplier circuit capable of servicing any number of telephone lines simultaneously. The unit operates to provide two message cycles to the first caller and then shut off. If, however, a second call is received while the first call is in progress, the second caller will hear the remaining portion of the message cycle that is in progress plus one additional complete message cycle before disconnecting the caller. Any number of additional callers may be received and served at the same time with each being controlled in accordance with the time at which the particular call is received.

The multiplier circuit for providing this function includes first and second control relays which are connected to be actuated through the switching posts that cooperate with the control tab on the tape, the circuit including a number of individual multiplier circuit modules connected in parallel relation with both of the control relays. Each multiplier circuit module is connected to a separate one of the telephone lines and includes sequencing relays having separate banks of contacts interconnected with the automatic answering unit to respond to the recorder coupler for the corresponding telephone line and initiate an automatic sequence of operation of the control relays and the answering unit.

A further feature of the invention relates to a cumulative counter incorporated in the multiplier and including an electroniccounter connected in parallel with each of the multiplier circuit modules to record each call received in the entire system.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification, and in which like numerals are employed to designate like parts throughout the same.

DESCRIPTION OF PREFERRED EMBODIMENT

Figure 1:
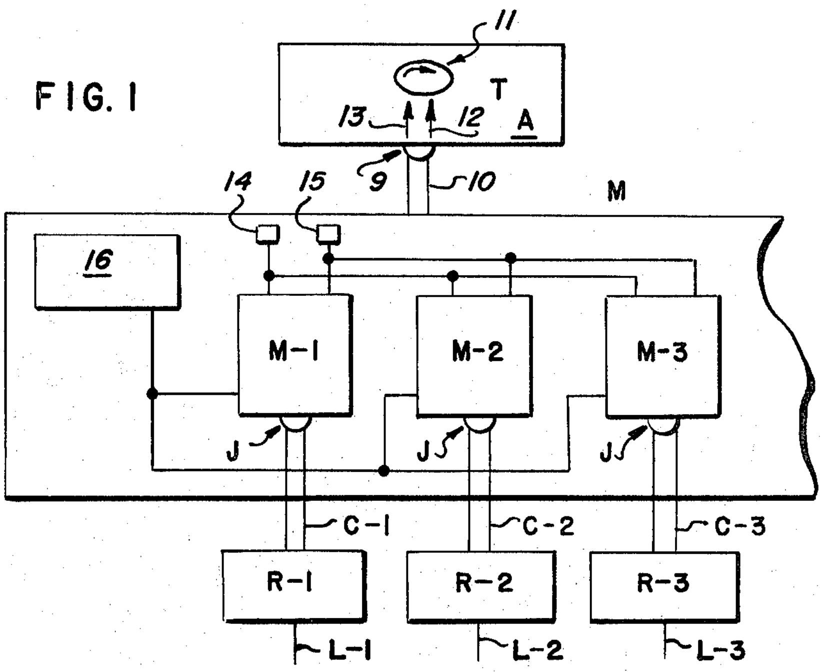
FIG. 1 is a schematic block diagram showing a multiple line answering system in accordance with this invention.

Referring now to the drawings, a generalized schematic circuit arrangement of a multiple line automatic telephone answering system is shown in FIG. 1 wherein a number of telephone lines L–1, L–2, L–3 are shown connected to separate recorder couplers R–1, R–2, R–3, respectively, the couplers being of a conventional type such as are furnished by the Bell System Telephone companies and identified as Bell System Model No. AS 19522 List 1 or List 2.

The automatic answering system for servicing these telephone lines is illustrated as consisting of two separate components: an automatic answering unit A and a multiplier circuit M. Separate cables C–1, C–2 and C–3, each containing seven control lines, lead from the recorder couplers R–1, R–2 and R–3 to the multiplier unit M which is, in turn, connected to the answering unit A by a master cable 10 which also contains seven control lines. All of the cables shown herein are typically terminated in conventional 9-pin sockets and the basic arrangement is standardized in the sense that any one of the cables C–1, C–2, C–3 could be plugged directly into the answering unit A in place of the master cable, in which case the answering unit A would function to serve one incoming line in the conventional prior art fashion.

Figure 3:
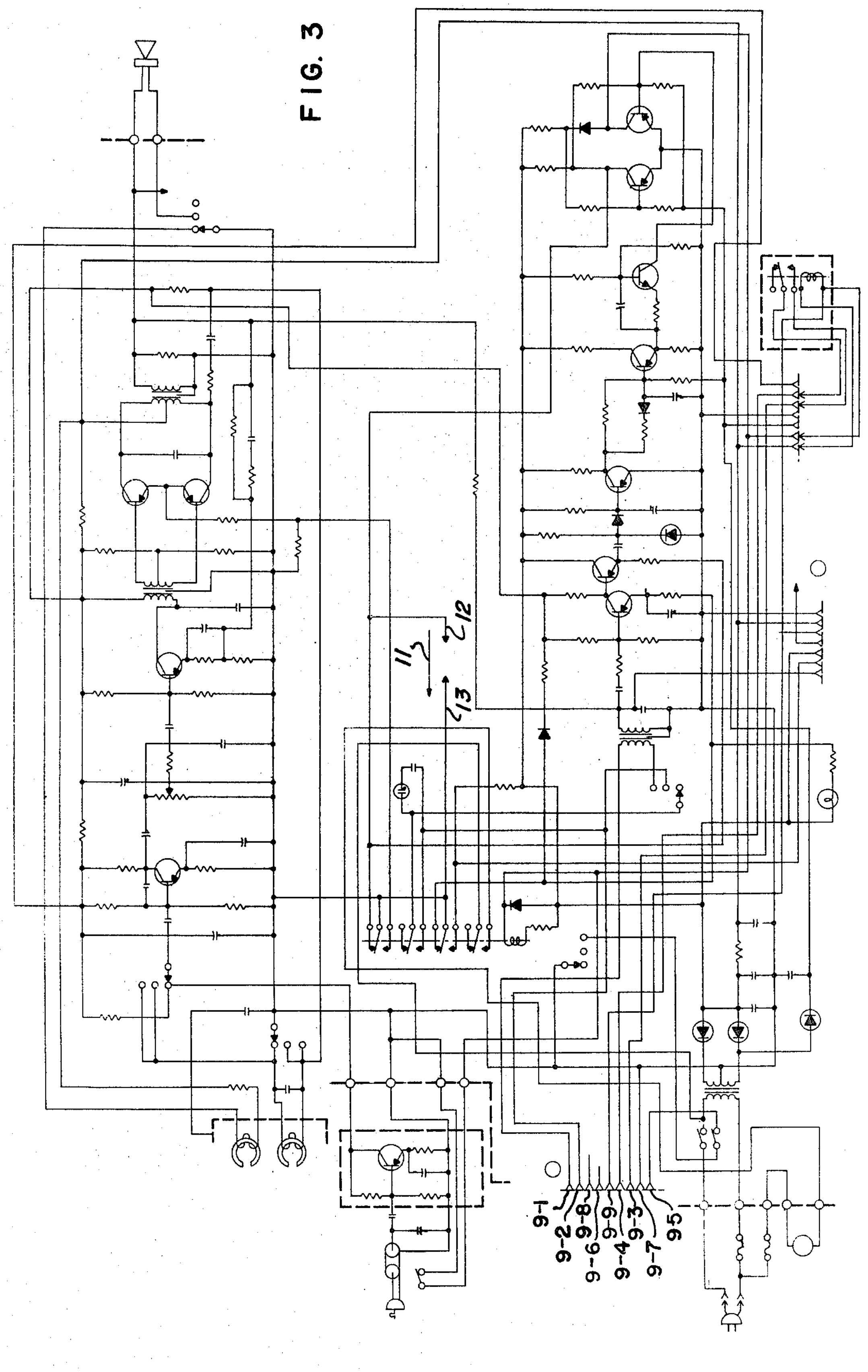
FIG. 3 is a detailed wiring diagram showing a conventional automatic answering unit utilized in the answering system of FIG. 1.

In the preferred arrangement illustrated herein, the answering unit A is of a type marketed by Morgan Industries, Inc. of Chicago, Illinois and identified as Model 40. For completeness, a schematic diagram of the Model 40 is included as FIG. 3 of the drawings. The answering unit A, as is known to those skilled in the art, consists of a continuous loop tape 11 having one metal control tab T thereon, the tape normally having a pre-recorded message thereon which is to be played back through any telephone line on which an incoming call is received. The answering unit A typically includes cycle control means for actuating the tape 11, the cycle control means including first and second switching posts 12,13 which are responsive to the control tab to cycle the tape through a message play-back sequence. When the tape is moved to a position where the tab is adjacent one of the posts, a number of circuit functions are thereby activated.

In accordance with the present invention, the multiplier unit M is provided to enable the single automatic answering unit A to service a number of telephone lines so that the capital expense is greatly reduced.

The multiplier circuit M includes a pair of control relays 14,15 which are connected to control lines 9–6 and 9–8 that lead from the answering unit A. The multiplier circuit also includes a separate multiplier circuit module M1, M2, M3 corresponding to each telephone line L–1, L–2, L–3. The group of multiplier circuit modules are connected in parallel to each of the control relays 14,15. Each of the multiplier circuit modules is connected to certain of the control lines leading from the co-responding recorder coupler (as identified by the J-number series) and is connected in common to certain of the control lines leading to the answering unit A (as identified by the 9–number series). To identify the interconnections between the multiplier circuit modules M–1, M–2, M–3 and the control cables C–1, C–2, C–3 from the recorder couplers R–1, R–2, R–3 and the control cable 10 to the answering unit A, the connectors which plug into the multiplier circuit modules are identified by reference character J and the connector that plugs into the answering unit A is identified by reference character 9. These connectors are standard 9-pin connectors but in the disclosed arrangement only seven control lines are used so that in each instance no connection is made on two of the pins. In relation to the Model 40 answering unit and its conventional connection with recorder couplers, the following designations are employed herein. The "J" connectors have the nine pins thereof connected as follows:

| | |
|---|---|
| J-1 | TO 9-1 |
| J-2 | TO 9-2 |
| J-3 | TO MULTIPLIER |
| J-4 | TO CABLE GROUND |
| J-5 | TO 9-5 COMMON |
| J-6 | NO |
| J-7 | GROUND |
| J-8 | NO |
| J-9 | TO MULTIPLIER |

The "9" connector plug associated with the answering unit A has its pins connected as follows:

| | |
|---|---|
| 9-1 | TO J-1 |
| 9-2 | TO J-2 |
| 9-3 | NO |
| 9-4 | NO |
| 9-5 | TO J-5 COMMON |
| 9-6 | TO MULTIPLIER |
| 9-7 | TO GROUND |
| 9-8 | TO MULTIPLIER |
| 9-9 | TO MULTIPLIER |

Finally, the multiplier circuit M includes a counter module 16 which has a counting relay 17 connected in parallel to a plurality of delay circuits D-1, D-2, D-3, there being one delay circuit corresponding to each multiplier module circuit and connected thereto to be actuated whenever an incoming call is received by the corresponding multiplier module circuit. The counting relay 17 controls a contact arm 18 which is in series with an electronic counter 19 which is pulsed once each time the delay circuit energizes the counting relay 17 so that the counter 19 provides a cumulative count of all calls received on the entire system.

Figure 2:
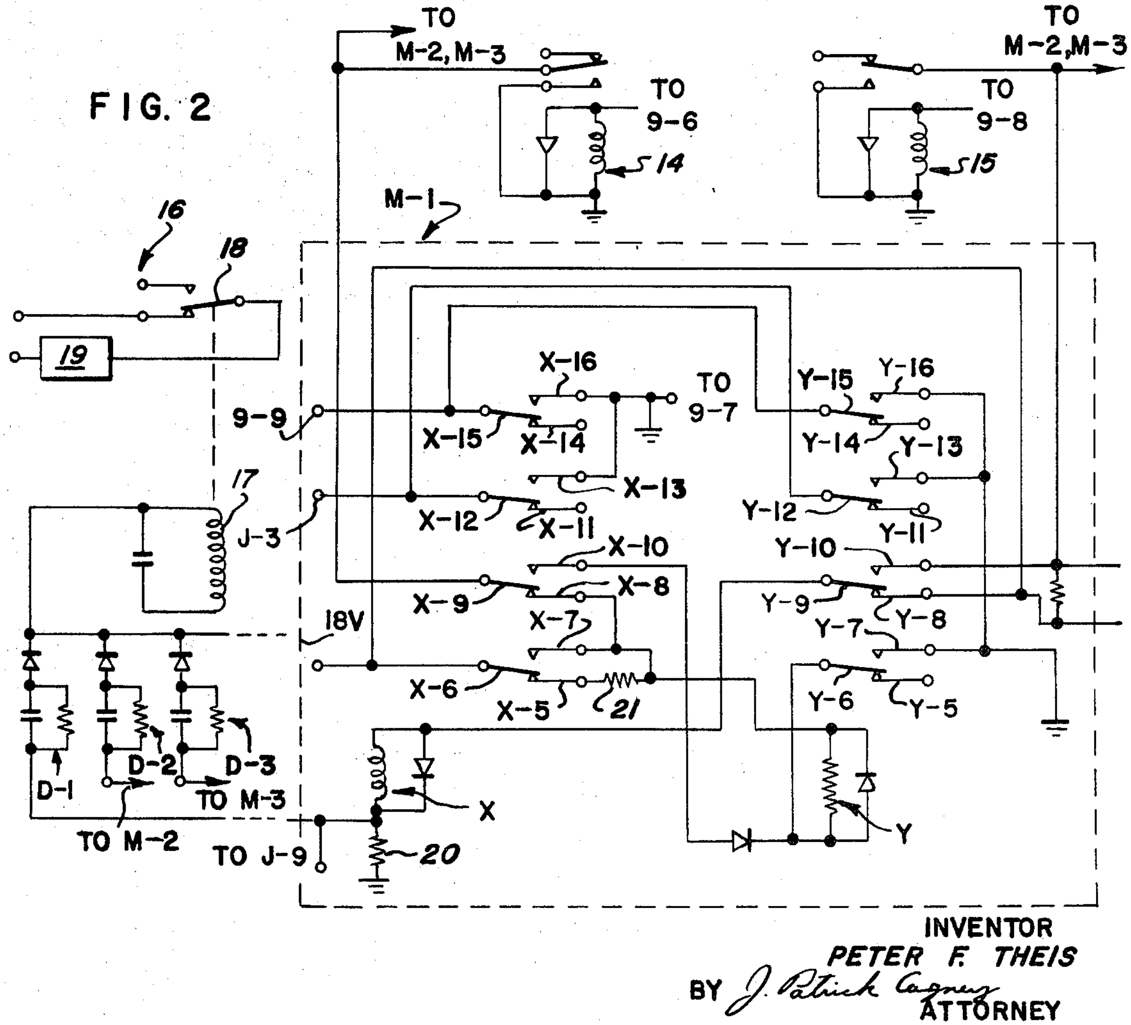
FIG. 2 is a detailed wiring diagram showing a multiplier circuit utilized in the answering system of FIG. 1.

Referring now to the circuit module M-1 which is shown in detail in FIG. 2, each multiplier circuit module includes a pair of sequencing relays X and Y. Relay X controls a bank of contact arms X-6, X-9, X-12 and X-15 which are connected to various terminal pins and voltage sources as identified by legends applied thereto. Correspondingly, relay Y controls a bank of contact arms Y-6, Y-9, Y-12 and Y-15 connected as shown on the drawing.

The operation of the system is now described in relation to the circuit arrangements shown in the drawings. When an incoming call is received, for example on line 1, the ringing signal triggers the recorder coupler R-1 to produce a closed circuit to pin J-9 associated with multiplier circuit module M-1. Upon establishing the circuit connection to pin J-9, the current limiting resistor 20 is shorted out and relay X is energized. When relay X is pulled in, its contact arm X-15 is connected to contact X-16 which, through the control line connection to pin 9-7 on the answering unit A, causes the automatic answering unit to start. Simultaneously, contact arm X-12 is connected to contact X-13 to cause seizure of the recorder coupler R-1. Also simultaneously, contact arm X-9 is connected to contact X-10 to establish a control sequence between the left hand control relay 14 and sequence relay Y. Contact arm X-6 acts in conjunction with contact arm X-9, with contact arm X-6 completing a bypass circuit through contact X-7 to short circuit the current limiting resistor 21 and set up a control circuit for energizing relay Y.

Thus, when relay Y is energized and pulled in, the answering unit A is turned on and the pre-recorded message is played back through line L-1. When the tape completes one cycle, its contact tab T provides a momentary ground to pin terminal 9-6 which is connected to the left hand control relay 14 for energizing the relay and causing its contact arm to provide a ground path for sequence relay Y which is then energized.

When Y pulls in, its contact arm Y-15 completes a path through contact Y-16 to ground to continue the operation of the automatic answering unit for one more cycle. Simultaneously, contact arm Y-12 completes a path through contact Y-13 to ground to hold the recorder coupler in. Contact arm Y-9 completes a path to contact Y-10 to connect relay X in circuit with the right hand control relay 15. Simultaneously, contact arm Y-6 completes a path to ground through contact Y-7 to provide a hold circuit for relay Y.

Shortly after relay Y is pulled in, the control tab T contacts the second shorting pole 13 causing relay X to drop out. The message is played one more time until the control tab returns to the first shorting pole 12 to provide a ground on the left hand control relay contact which also grounds the hot side of relay Y causing it to drop out and allow the corresponding recorder coupler to be disconnected. This stops the automatic answering device unless another telephone line has received an incoming call during the sequence just described for line L-1.

In summary, when the answering unit is not in operation and a call is received on any line that is tied to the multiplier, the automatic answering unit is equenced to seize the corresponding recorder coupler and play back the pre-recorded message. The message goes through one complete cycle and then through a second complete cycle before disconnecting the caller. If, during this sequence one or more additional calls come in on other lines, each such additional call hears the remainder of the message cycle currently in progress plus one complete additional cycle before being disconnected.

With respect to the counter, it will be noted that whenever a call is received on any line, the terminal pin J-9, which is common to each multiplier module, is grounded for that line to complete a path through the corresponding delay circuit for the counting relay 17.

Thus, while preferred constructional features of the invention are embodied in the structure illustrated herein, it is to be understood that changes and variations may be made by those skilled in the art without departing from the spirit and scope of the appended claims.

What is claimed is:

1. In a multiple line automatic telephone answering system wherein a number of telephone lines are connected through corresponding recorder couplers to be served by a single telephone answering unit that includes a continuous tape loop having a control tab, said tape having a pre-recorded message thereon, and means including first and second switching posts for controlling cycling of the tape to play back said message, the improvement comprising a multiplier circuit having first and second control relay means connected to said first and second posts, respectively, each to be connected in circuit with the answering unit when said tab contacts the corresponding post, and a plurality of multiplier circuit modules connected in parallel circuit relation with both of said control relay means, each circuit module being connected to a separate one of said recorder couplers and including first sequencing relay means having a bank of contacts interconnected with said answering unit and responsive to a call received on the corresponding recorder coupler to start said answering unit and seize the corresponding recorder coupler and a second sequencing relay means having a bank of contacts interconnected with said answering unit and responsive to said first control relay means when the tape completes one cycle to bring said control tab into contact with the post corresponding to said first control relay to continue the operation of the automatic answering unit for one more cycle.

2. In a system as defined in claim 1 and wherein said multiplier circuit includes a totalizing counter, a relay for pulsing the counter and a plurality of parallel circuit paths connecting the last-named relay to each multiplier circuit module to actuate the relay once for each call received by any of said circuit modules.

* * * * *